US012470613B2

(12) United States Patent
Thomas et al.

(10) Patent No.: US 12,470,613 B2
(45) Date of Patent: Nov. 11, 2025

(54) METHODS AND INTERFACES FOR MANAGING A USER INTERFACE OF A COMMUNICATION TERMINAL IN ONGOING COMMUNICATION, AND FOR MONITORING THE USER INTERFACE

(71) Applicant: Orange, Issy-les-Moulineaux (FR)

(72) Inventors: Henry Thomas, Châtillon (FR);
Andrew Bishara Meleka, Cairo (EG);
Mahmoud Gamal El-Din, Giza (EG);
Ahmed Maged, Heliopolis (EG)

(73) Assignee: ORANGE, Issy-les-Moulineaux (FR)

( * ) Notice: Subject to any disclaimer, the term of this patent is extended or adjusted under 35 U.S.C. 154(b) by 193 days.

(21) Appl. No.: 17/433,415

(22) PCT Filed: Feb. 24, 2020

(86) PCT No.: PCT/FR2020/050346
§ 371 (c)(1),
(2) Date: Aug. 24, 2021

(87) PCT Pub. No.: WO2020/174168
PCT Pub. Date: Sep. 3, 2020

(65) Prior Publication Data
US 2022/0150289 A1 May 12, 2022

(30) Foreign Application Priority Data

Feb. 25, 2019 (FR) ...................................... 1901877

(51) Int. Cl.
*H04L 65/401* (2022.01)
*H04L 65/1069* (2022.01)
(Continued)

(52) U.S. Cl.
CPC ...... *H04L 65/4015* (2013.01); *H04L 65/1069* (2013.01); *H04M 1/72436* (2021.01); *H04M 1/72439* (2021.01)

(58) Field of Classification Search
CPC ............ H04L 65/4015; H04L 65/1069; H04M 1/7243
See application file for complete search history.

(56) References Cited

U.S. PATENT DOCUMENTS

| 2011/0003585 A1* | 1/2011 | Wang ................ H04M 1/72469 |
| | | 455/418 |
| 2015/0105036 A1* | 4/2015 | Goomansingh ..... H04M 1/7243 |
| | | 455/113 |

(Continued)

FOREIGN PATENT DOCUMENTS

| EP | 1988699 A1 | 11/2008 |
| EP | 2685701 A1 | 1/2014 |
| WO | WO 2017/070797 A1 | 5/2017 |

OTHER PUBLICATIONS

International Search Report and Written Opinion dated May 13, 2020 for Application No. PCT/FR2020/050346.

*Primary Examiner* — Nam T Tran
(74) *Attorney, Agent, or Firm* — Knobbe, Martens, Olson & Bear, LLP (57) ABSTRACT

The disclosed technology relates to the management of a user interface of a communication terminal involved in ongoing communication by a communication terminal, referred to as an initiator terminal. A method is described for managing a user interface of at least one communication terminal by an initiator terminal during ongoing communication between communication terminals including the initiator terminal and at least one corresponding terminal, the user interface management method comprising, at least prior to a change, triggered by the initiator terminal, of the (Continued)

communication mode of the ongoing communication, providing change signaling data to the user interface of the at least one communication terminal, the change signaling data being able to control the user interface of a communication terminal. The risks of failure of the change of communication mode and therefore of unwanted closure of the ongoing communication are therefore reduced or even avoided.

15 Claims, 6 Drawing Sheets

(51) Int. Cl.
*H04M 1/72436* (2021.01)
*H04M 1/72439* (2021.01)

(56) References Cited

U.S. PATENT DOCUMENTS

2016/0139785 A1* 5/2016 Griffin .................. H04M 1/724
715/753
2016/0205240 A1 7/2016 Jeoung

* cited by examiner

Fig. 5f

METHODS AND INTERFACES FOR MANAGING A USER INTERFACE OF A COMMUNICATION TERMINAL IN ONGOING COMMUNICATION, AND FOR MONITORING THE USER INTERFACE

RELATED APPLICATIONS

This application is the U.S. National Phase of Application No. PCT/FR2020/050346 entitled "METHODS AND INTERFACES FOR MANAGING A USER INTERFACE OF A COMMUNICATION TERMINAL IN ONGOING COMMUNICATION, AND FOR MONITORING THE USER INTERFACE" and filed Feb. 24, 2020, which claims the benefit of French Patent Application No. 1901877, filed Feb. 25, 2019, each of which is incorporated by reference in its entirety.

TECHNICAL FIELD

The invention relates to the management of a user interface of a communication terminal involved in an ongoing communication by a communication terminal, called initiator terminal, at the origin of an operation relating to an ongoing communication, such as a change of communication mode.

PRIOR ART

At present, when a communication is established, the user interface of the calling terminal, prior to the triggering of the establishment, reproduces a list of at least one selectable contact (for each contact, the one or more communication modes able to be used to establish a communication with this contact), and/or a trigger element triggering capturing of a communication identifier, such as an email address, a telephone number, etc. The user of the calling terminal interacts with the user interface so as to trigger a communication in a given communication mode with a called communication terminal possibly associated with the selected contact.

During the establishment of the communication, the user interface of the calling terminal generally reproduces at least the identifier of the called communication terminal, possibly an identifier of the user of the called communication terminal (name, nickname, alias, etc.), the communication network that is used, possibly the power of the communication network used for the calling communication terminal, the status of the communication (establishment in progress, busy, etc.), etc. In parallel, the user interface of the called communication terminal reproduces the identifier of the calling communication terminal, possibly an identifier of the user of the calling communication terminal (name, nickname, alias, etc.), the communication network that is used, possibly the power of the communication network used for the called communication terminal, the status of the communication (establishment in progress, busy, etc.), etc.

During the communication, this same information remains reproduced, respectively, by the user interface of the calling communication terminal and the user interface of the called communication terminal. The communication status is then ongoing communication.

Modern communication terminals, in particular mobile communication terminals, generally allow multiple communication modes:

either by changing communication network: mobile telephony, IP telephony on a mobile or fixed network;
or by changing exchange method: voice, video, text, etc.

In general, when a communication is started in a given communication mode, it is performed completely in this communication mode, even if the connection and/or the quality deteriorates. Indeed, when a user of a communication terminal no longer hears his contact partner during a communication, he generally closes the ongoing communication in order to renew it in the same communication mode. However, the new communication that is established may encounter the same poor conditions as the closed communication, thereby not solving the user's problem.

In addition, the contact partner may be confused by this unilateral closure of the communication, causing him to act in particular by attempting to re-establish the communication, generally in the same communication mode, with the risk of cross-communications, and therefore communication establishment that fails on both sides. Another action by the contact partner may be to put his communication terminal into an "offline" status, such as airplane mode for mobile telephones, because he thinks that the communication has ended.

DISCLOSURE OF THE INVENTION

One of the aims of the present invention is to rectify drawbacks of the prior art.

One subject of the invention is a method for the management of a user interface of at least one communication terminal by an initiator terminal during an ongoing communication between communication terminals including the initiator terminal and at least one correspondent terminal, the user interface management method comprising, at least prior to a change, triggered by the initiator terminal, of communication mode of the ongoing communication, provision of change signaling data to the user interface of the at least one communication terminal, the change signaling data being able to control the user interface of a communication terminal.

Thus, if the initiator terminal triggers a change of the communication mode of the ongoing communication with at least one correspondent terminal, the user interface of at least one communication terminal takes account, during the ongoing communication, of the change in order to reduce or even avoid the risks of failure of the change of communication mode of the ongoing communication and therefore of untimely closure of the ongoing communication.

According to the variant implementations of the invention, the initiator terminal provides the change signaling data to the user interface of one or more of the communication terminals in the ongoing communication, in particular the initiator terminal and/or one or more correspondent terminals. Thus, the more the change signaling data are provided to a large number of user interfaces of communication terminals in the communication, the more the probability of failure of the change of communication mode is reduced.

Furthermore, when the change signaling data are not provided to the user interfaces of all of the communication terminals in the ongoing communication, the probability of failure of the change of communication mode is reduced if the change signaling data are provided to a user interface of a correspondent terminal rather than to a user interface of the initiator terminal.

Advantageously, the provision of change signaling data to the user interface of the at least one communication terminal comprises transmission of the change signaling data to at least one correspondent terminal, the change signaling data being able to control the user interface of the correspondent terminal.

Advantageously, the management method comprises generation of change signaling data on the basis of the triggered change of communication mode.

Advantageously, the change signaling data prior to the change of communication mode integrate a blocking command to block the user interface of the communication terminal during the change of communication mode.

Thus, not only is the user of the communication terminal possibly informed of the change currently being executed but, in addition, the user of the communication terminal is not able to interact with the communication terminal, in particular so as to close the ongoing communication or modify the communication mode of the ongoing communication, thus completely avoiding the risks of failure of the change of communication mode and of untimely closure of the communication.

Advantageously, the change signaling data integrate an information reproduction signal for reproducing information relating to the change of communication mode.

The user of the communication terminal is thus informed of the change currently being executed, thus completely reducing the risks of failure of the change of communication mode and of untimely closure of the communication.

Advantageously, the management method comprises, when the change of communication mode of the ongoing communication ends, provision, to at least one communication terminal, of end of change signaling data able to command the return of the user interface of the correspondent terminal to a nominal state.

The user interface of the correspondent terminal thus returns to a nominal mode during a communication.

Advantageously, the end of change signaling data integrate an unblocking command to unblock the user interface.

The user of the communication terminal is thus again able to interact with the communication terminal when the change has finished.

Advantageously, the user interface management method comprises an authorization to change communication mode, the authorization to change communication mode preventing the change of communication mode of the ongoing communication for as long as the change signaling data are not provided to at least the user interface of the at least one correspondent terminal.

Another subject of the invention is a method for controlling a user interface of a communication terminal during a communication between communication terminals including an initiator terminal and at least one correspondent terminal, the control method comprising, at least prior to a change, triggered by the initiator terminal, of communication mode of the ongoing communication, modification of at least one parameter of the user interface of the communication terminal upon command from change signaling data provided by the initiator terminal.

Advantageously, according to one implementation of the invention, the various steps of the method according to the invention are implemented by software or a computer program, this software comprising software instructions intended to be executed by a data processor of a device and being designed to command the execution of the various steps of this method.

The invention therefore also targets a program comprising program code instructions for executing the steps of at least one of the following methods:

a method for the management of a user interface of at least one communication terminal by an initiator terminal during an ongoing communication, a method for controlling a user interface of a communication terminal, when said program is executed by a processor.

This program may use any programming language, and be in the form of source code, object code, or intermediate code between source code and object code, such as in a partially compiled form, or in any other desirable form.

Another subject of the invention is a management interface of an initiator terminal that has triggered a change of communication mode during an ongoing communication between communication terminals including the initiator terminal and at least one correspondent terminal, comprising a provider for providing change signaling data to a user interface of a communication terminal in the ongoing communication, the change signaling data being able to control the user interface of a communication terminal, the provider being triggered prior to the change of communication mode.

Another subject of the invention is a user interface of a correspondent terminal during a communication between communication terminals including an initiator terminal and at least one correspondent terminal, the user interface of the correspondent terminal comprising a modifier for modifying at least one parameter of the user interface of the correspondent terminal upon command from the change signaling data received from the initiator terminal, the modifier being implemented at least prior to a change, triggered by the initiator terminal, of communication mode of the ongoing communication.

Another subject of the invention is a user interface of an initiator terminal during a communication between communication terminals including an initiator terminal and at least one correspondent terminal, the user interface of the initiator terminal comprising a modifier for modifying at least one parameter of the user interface of the initiator terminal upon command from the change signaling data provided by the initiator terminal, the modifier being implemented at least prior to a change, triggered by the initiator terminal, of communication mode of the ongoing communication.

Another subject of the invention is an initiator terminal comprising:

a switch for switching communication mode, implementing, upon command from the initiator terminal, a change of communication mode of an ongoing communication between the initiator terminal and at least one correspondent terminal, a user interface according to the invention, and a management interface according to the invention.

Advantageously, the initiator terminal furthermore comprises:

a first communication interface with a first communication network implementing a first communication mode, and at least one second communication interface with a second communication network separate from the first communication network and implementing at least one second communication mode.

Another subject of the invention is a correspondent terminal comprising:

a communication interface able to receive communication signaling data from an initiator terminal in an ongoing communication and to modify parameters of the communication interface on the basis of the communication signaling data, the communication signaling data being able to authorize a change of communication mode of the ongoing communication by the correspondent terminal, and a user interface according to the invention.

Advantageously, the correspondent terminal furthermore comprises:
- a first communication interface with a first communication network implementing a first communication mode, and
- at least one second communication interface with a second communication network separate from the first communication network and implementing at least one second communication mode.

BRIEF DESCRIPTION OF THE DRAWINGS

The features and advantages of the invention will become more clearly apparent upon reading the description, given by way of example, and the related figures, in which.

DESCRIPTION OF THE EMBODIMENTS

Figure 1:
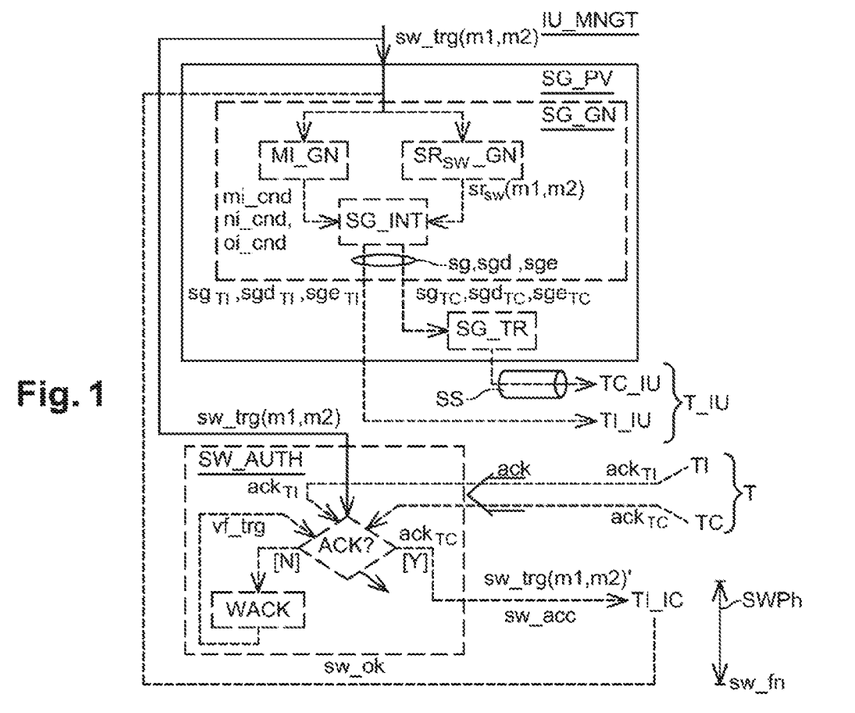
FIG. 1 shows a simplified diagram of a method for managing a user interface of communication terminals during an ongoing communication according to the invention.

FIG. 1 illustrates a simplified diagram of a method for managing a user interface of communication terminals during an ongoing communication according to the invention.

The method IU_MNGT for managing a user interface of at least one communication terminal is implemented by an initiator terminal TI during an ongoing communication SS between communication terminals including the initiator terminal TI and at least one correspondent terminal TC. The user interface management method IU_MNGT comprises, at least prior to a change SW, triggered sw_trg by the initiator terminal TI, of communication mode of the ongoing communication, provision of change signaling data SG_PV to the user interface of the at least one communication terminal T_IU, TI_IU, TC_IU. The change signaling data sg, $sg_{TI}$, $sg_{TC}$, sgd, $sgd_{TI}$, $sgd_{TC}$, sge, $sge_{TI}$, $sge_{TC}$ are able to control the user interface of a communication terminal T_IU, TI_IU, TC_IU.

In particular, the provision of change signaling data SG_PV to the user interface of the at least one communication terminal TC_IU comprises transmission of the change signaling data SG_TR to at least one correspondent terminal TC. The change signaling data $sg_{TC}$, $sgd_{TC}$, $sge_{TC}$ are able to control the user interface of the correspondent terminal TC_IU.

In particular, the management method comprises generation SG_GN of change signaling data sg, $sg_{TI}$, $sg_{TC}$, sgd, $sgd_{TI}$, $sgd_{TC}$, sge, $sge_{TI}$, $sge_{TC}$ on the basis of the triggered change of communication mode sw_trg(m1,m2).

According to the embodiments of the user interface management method IU_MNGT, the provision of change signaling data SG_PV comprises in particular one or more of the following steps:
- generation of change signaling data SG_GN,
- transmission of change signaling data SG_TR to at east one user interface of a correspondent terminal of the ongoing communication.

In particular, the change signaling data prior to the change of communication mode sg, $sg_{TI}$, $sg_{TC}$, sgd, $sgd_{TI}$, $sgd_{TC}$ integrate a blocking command ni_cmd to block the user interface of the communication terminal T_IU, TI_IU, TC_IU during the change of communication mode SWPh. Optionally, the generation of change signaling data SG_GN comprises integration SG_INT of a blocking command ni_cmd to block the user interface of the communication terminal T_IU, TI_IU, TC_IU during the change of communication mode SWPh.

In particular, the change signaling data sg, $sg_{TI}$, $sg_{TC}$, sgd, $sgd_{TI}$, $sgd_{TC}$, sge, $sge_{TI}$, $sge_{TC}$ integrate an information reproduction signal $sr_{sw}(m1,m2)$ for reproducing information relating to the change of communication mode. Optionally, the generation of change signaling data SG_GN comprises integration SG_INT of an information reproduction signal $sr_{sw}(m1,m2)$ for reproducing information relating to the change of communication mode into the change signaling data.

In particular, the integration SG_INT comprises integrating one or more of the following items of data into the change signaling data:
- interaction modification command mi_cmd, such as user interface blocking command ni_cmd or unblocking command oi_cmd, etc.
- information reproduction signal for reproducing information relating to the change of communication mode $sr_{sw}(m1,m2)$, comprising in particular a message to be reproduced containing at least one of the following items of information:
  - the communication mode before the change m1, also called starting mode,
  - the communication mode after the change m2, also called end mode,
  - an identifier of the initiator terminal,
  - an item of data relating to the type of change: automatic, push, manual, etc.
  - an item of data about the cause of change: poor quality, connection problem, etc.

An automatic type of change is understood to mean that the initiator terminal implements a method for monitoring the various communication modes able to be used for the ongoing communication between the initiator terminal and the one or more correspondent terminals. The monitoring method triggers a change of communication mode on the basis of predefined change criteria, such as quality data regarding the ongoing communication that are below a predefined quality threshold, or a quality difference between the ongoing communication and another communication mode that is negative and/or less than a predefined delta, a frequency of connection problems with the ongoing communication that is higher than a predefined frequency threshold, etc.

A push type of change is understood to mean that the initiator terminal implements a method for monitoring the various communication modes able to be used for the ongoing communication between the initiator terminal and the one or more correspondent terminals. The monitoring method triggers a proposal to change communication mode to the user of the initiator terminal, in particular by pushing the reproduction of a change proposal message. The triggering of the change proposal is based on predefined change criteria, such as quality data regarding the ongoing communication that are below a predefined quality threshold, or a quality difference between the ongoing communication and another communication mode that is negative and/or less than a predefined delta, a frequency of connection problems with the ongoing communication that is higher than a predefined frequency threshold, etc. Optionally, the reproduced proposal message is an interactive message allowing the user to select the triggering of the proposed change of communication mode or to keep it in the communication mode of the ongoing communication.

A manual type of change is understood to mean that the user interface of the initiator terminal reproduces selectable elements corresponding to each communication mode able to be used for the ongoing communication between the initiator terminal and the one or more correspondent terminals, and that the user selects, during the ongoing communication, by interacting with a reproduced selectable element, a communication mode different from that used by the ongoing communication, thus triggering a change of communication mode of the ongoing communication.

In particular, the management method IU_MNGT comprises, when the change of communication mode of the ongoing communication ends SW_fn, provision SG_PV, to at least one communication terminal T, TI, TC, of end of change signaling data sg, $sg_{TI}$, $sg_{TC}$, sge, $sge_{TI}$, $sge_{TC}$ able to command the return of the user interface of the correspondent terminal to a nominal state.

In particular, the end of change signaling data sg, $sg_{TI}$, $sg_{TC}$, sge, $sge_{TI}$, $sge_{TC}$ integrate an unblocking command to unblock the user interface oi_cmd. Optionally, the generation of change signaling data SG_GN comprises integration SG_INT of an unblocking command oi_cmd to unblock the user interface of the communication terminal T_IU, TI_IU, TC_IU after the change of communication mode SWPh.

In particular, the generation of change signaling data SG_GN comprises generation of an interaction modification command MI_GN. The interaction modification command mi_cmd is in particular a blocking command ni_cmd to block the user interface of the communication terminal T_IU, TI_IU, TC_IU during the change of communication mode SWPh, an unblocking command oi_cmd to unblock the user interface of the communication terminal T_IU, TI_IU, TC_IU after the change of communication mode SWPh, etc.

In particular, the user interface management method IU_MNGT comprises an authorization to change communication mode SW_AUTH. The authorization to change communication mode SW_AUTH prevents the change of communication mode SW of the ongoing communication for as long as the change signaling data are not provided to at least the user interface of the communication terminal T_IU, in particular of the correspondent terminal TC_IU.

In particular, the authorization to change communication mode SW_AUTH is triggered by the change trigger signal sw_trg(m1,m2).

Figure 3:
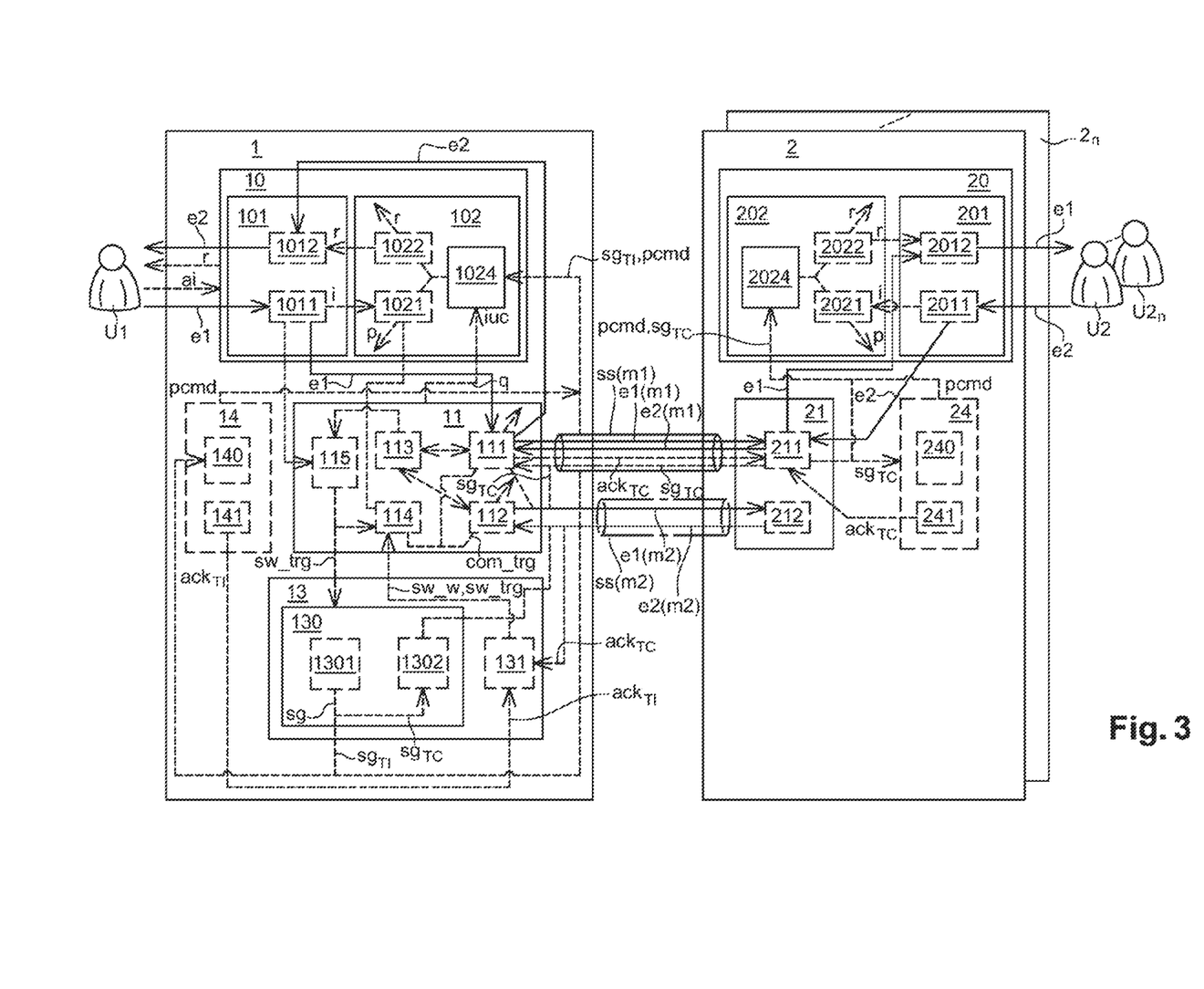
FIG. 3 shows a simplified diagram of the exchanges in a communication architecture implementing the methods of the invention.

In a first variant, the authorization to change communication mode SW_AUTH is situated between the change command step SWC and the actual change step SW (these two steps are illustrated in FIG. 3). The authorization to change communication mode SW_AUTH then comprises retention of the change trigger signal sw_trg(m1,m2) provided by the change command SWC for as long as the change signaling data have not been provided to the one or more communication terminals. The change of communication mode SW will thus receive the change trigger signal sw_trg(m1,m2) only when the change signaling data have been provided to the one or more communication terminals.

In a second variant, the authorization to change communication mode SW_AUTH comprises transmission of a put on hold command sw_w (not illustrated) to the actual change step SW (illustrated in FIG. 3), triggered by the receipt of the change trigger signal sw_trg(m1,m2). The change of communication mode SW thus puts the received change trigger command sw_trg(m1,m2) on hold until receipt of a change authorization command sw_acc from the authorization to change communication mode SW_AUTH.

In particular, the authorization to change communication mode SW_AUTH comprises receipt of an item of information relating to the provision of the change signaling data prior to the change sgd, $sgd_{TI}$, $sgd_{TC}$: such as an item of transmission information (not illustrated) originating from the transmission step SG_TR, and/or acknowledgement of receipt data from the communication terminal ack, $ack_{TI}$, $ack_{TC}$, etc.

In particular, the authorization to change communication mode SW_AUTH comprises a check ACK? on information relating to the provision of the change signaling data prior to the change. If the check is positive [Y], the change of communication mode is authorized: depending on the variant, the change trigger signal sw_trg(m1,m2) or an authorization command sw_acc is transmitted to the communication interface of the initiator terminal implementing in particular the change of communication mode SW. If the check is negative [N], the change of communication mode remains on hold. In particular, the check ACK? is repeated until receipt of information relating to the provision of the change signaling data prior to the change. In particular, the authorization to change communication mode SW_AUTH comprises a delay WACK. The delay WACK delays the following check ACK? either for a predefined period of time or until detection of at least one item of information relating to the provision of the change signaling data prior to the change.

In one particular embodiment of the change authorization SW_AUTH, the check ACK? is positive [Y] when all of the communication terminals T intended to receive change of communication mode signaling data prior to the change sgd have provided acknowledgement of receipt data ack.

One embodiment of the management method IU_MNGT is a program comprising program code instructions for executing the steps of the management method IU_MNGT when said program is executed by a processor.

Figure 2:
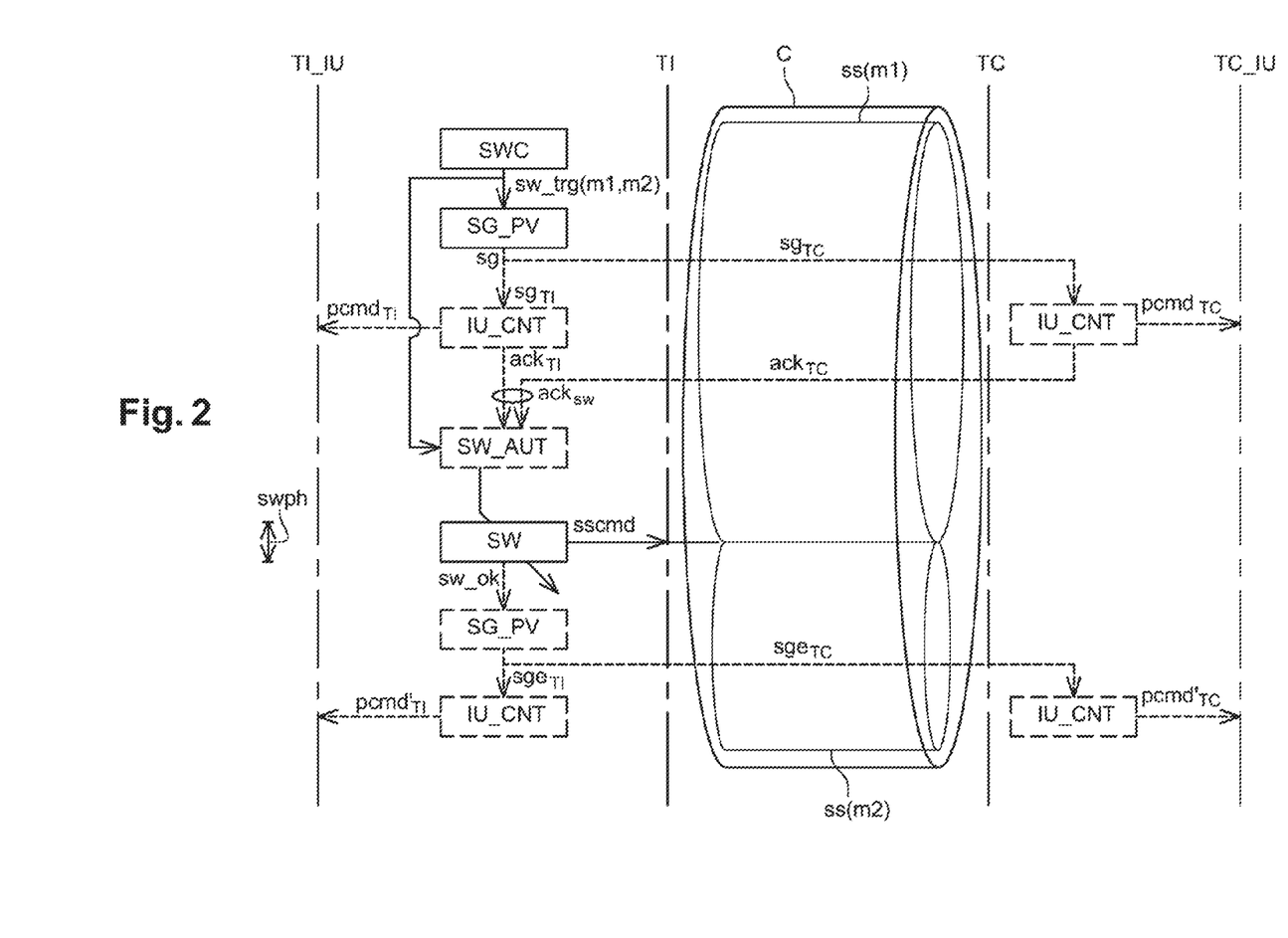
FIG. 2 shows a simplified diagram of a method for controlling a user interface of a communication terminal during an ongoing communication according to the invention.

FIG. 2 illustrates a simplified diagram of a method for controlling a user interface of a communication terminal during an ongoing communication according to the invention.

The method IU_CNT for controlling a user interface of a communication terminal is implemented during a communication between communication terminals T including an initiator terminal TI and at least one correspondent terminal TC. The control method IU_CNT comprises, at least prior to a change SW, triggered by the initiator terminal TI, of communication mode of the ongoing communication, modification P_MDF of at least one parameter of the user interface of the communication terminal T_IU upon command from change signaling data sg, $sg_{TI}$, $sg_{TC}$ provided by the initiator terminal TI.

The method for controlling a user interface IU_CNT is implemented by a communication terminal in the ongoing communication from among the initiator terminal TI and the one or more correspondent terminals TC. The control method IU_CNT thus modifies a parameter of the user interface of the initiator terminal TI_IU, respectively of a correspondent terminal TC_IU.

In particular, the one or more modified parameters is (are) at least one interaction parameter pi and/or one item of data to be reproduced r.

Optionally, the parameter modification P_MDF comprises modification of at least one interaction parameter PI_MDF that modifies an interaction parameter pi of the user interface of the communication terminal T_IU on the basis of the provided change signaling data sg, $sg_{TI}$, $sg_{TC}$, in particular an interaction modification command mi_cmd integrated into the provided change signaling data sg, $sg_{TI}$, $sg_{TC}$, such as a blocking command ni_cmd to block or an unblocking command oi_cmd to unblock the user interface T_IU.

Optionally, the parameter modification P_MDF comprises modification of at least one item of data to be reproduced PR_MDF so as to modify the item of data to be reproduced r on the basis of, and/or add thereto an information reproduction signal for reproducing information relating to the change of communication mode $sr_{sw}$(m1, m2)—comprising in particular a message to be reproduced—integrated into the provided change signaling data sg, $sg_{TI}$, $sg_{TC}$. The resulting item of data to be reproduced r thus contains the information reproduction signal for reproducing information relating to the change $sr_{sw}$: $r \supset sr_{sw}$.

In particular, the parameter modification P_MDF comprises extraction of the change signaling data SG_XT. In particular, the extraction of the change signaling data SG_XT reads, from the change signaling data sg, $sg_{TI}$, $sg_{TC}$, one or more items of data, such as in particular one or more interaction parameter modification commands mi_cmd, and/or one or more information reproduction signals for reproducing information relating to the change of communication mode $sr_{sw}$, etc.

In particular, the parameter modification P_MDF generates a user interface parameter command pcmd provided to the user interface of the communication terminal T_IU. The parameter command pcmd, when it is executed by the user interface T_IU, makes it possible to control the user interface T_IU in particular by modifying an interaction element of the user interface (for example by masking or by prohibiting interaction with one or more selectable elements controlling the ongoing communication) and/or by adding a change of communication mode message (either a simple icon or a simple voice message to wait, or a more explicit message specifying the starting communication mode and the end communication mode, for example "the ongoing communication will be continued in mobile telephony mode", "the ongoing communication will change from IP video mode to IP audio mode", etc. These change messages may be displayed and/or broadcast (audio), etc.

If the controlled user interface T_IU is a user interface of a correspondent terminal TC_IU, the control method IU_CNT comprises in particular receipt SG_RC of change signaling data $sg_{TC}$.

In particular, the user interface control method IU_TR comprises transmission of an acknowledgement of receipt of change SW_AR to the initiator terminal TI. The transmission of an acknowledgement of receipt of change SW_AR is triggered by one of the following steps:
receipt of change signaling data SG_RC,
starting of the parameter modification P_MDF,
ending of the parameter modification P_MDF, in particular the parameter command pcmd provided by the parameter modification P_MDF, etc.

The transmission of an acknowledgement of receipt of change SW_AR transmits data ack indicating that the user interface control method IU_CNT has been notified sg of a change of communication mode, also called acknowledgement of receipt data ack.

The acknowledgement of receipt data ack thus allow the initiator terminal TI to be informed that the user interface T_IU has been or will be modified. This allows the initiator terminal TI to check that the change is not performed beforehand.

One embodiment of the methods according to the invention is a program comprising program code instructions for executing the steps of at least one of the following methods:
a method for the synchronized management of a user interface of at least one communication terminal by an initiator terminal during an ongoing communication,
a method for controlling a user interface of a communication terminal formed by the initiator terminal,
a method for controlling a user interface of a communication terminal formed by a correspondent terminal,
when said program is executed by a processor.

FIG. 3 illustrates a simplified diagram of the exchanges in a communication architecture implementing the methods of the invention.

Communication terminals are communicating: they have in particular established a communication session SS using a first communication mode m1. In the example of FIG. 3, these communication terminals consist of two communication terminals: an initiator terminal TI and a correspondent terminal TC. The communication terminal at the origin of the communication SS(m1), generally called calling terminal, may be either of the two terminals, specifically the initiator terminal TI or the correspondent terminal TC.

These communication terminals, specifically the initiator terminal TI and the correspondent terminal TC, may use a plurality of separate communication modes to communicate with one another. A communication mode is understood to mean a different communication interface: first communication interface, second communication interface, etc. (for example a mobile telephony communication interface, an IP telephony communication interface, etc.), and/or a different communication format: first communication format, second communication format, etc. (voice, video, text, etc.), etc.

The initiator terminal TI triggers a change sw_trg(m1,m2) of communication mode from a first communication mode m1 to a second communication mode m2, for example from IP video mode to IP audio mode, from mobile telephony mode to IP audio mode, etc. In particular, the initiator terminal TI implements a change command SWC providing a change trigger signal sw_trg(m1,m2).

The initiator terminal TI provides change signaling data SG_PV to at least one communication terminal TI, TC in the ongoing communication SS(m1), Three variant embodiments of the provision SG_PV are then possible: In a first variant of the provision, the provision SG_PV transmits change signaling data $sg_{TC}$ to the user interface of the correspondent terminal TC. In a second variant of the provision, the provided change signaling data $sg_{TI}$ are intended for the user interface of the initiator terminal TI. In a third variant of the provision, the provision SG_PV transmits change signaling data $sg_{TC}$ to the user interface of the correspondent terminal TC and provides change signaling data $sg_{TI}$ to the user interface of the initiator terminal TI.

In particular, the change signaling data $sg_{TC}$ are transmitted to the correspondent terminal TC via the ongoing communication SS(m1).

In this third variant, the provision SG_PV of the change signaling data $sg_{TC}$ to the user interface of the correspondent terminal TC and the provision SG_PV of the change signaling data $sg_{TI}$ to the user interface of the initiator terminal TI may be performed simultaneously. The change is thus signaled synchronously to all of the user interfaces of the communication terminals TI and TC in the ongoing communication.

In particular, the initiator terminal TI implements user interface management (not illustrated) comprising the provision SG_PV of change signaling data.

In particular, the initiator terminal TI implements user interface control IU_CNT controlling parameters $pcmd_{TI}$ of its user interface TI_IU on the basis of the change signaling data $sg_{TI}$.

In particular, the correspondent terminal TC implements user interface control IU_CNT controlling parameters $pcmd_{TC}$ of its user interface TC_IU on the basis of the change signaling data $sgr_{TC}$.

Optionally, in the third variant, the provision SG_PV of the change signaling data controls simultaneous, or even synchronized, execution of the user interface control IU_CNT implemented by the initiator terminal TI and the user interface control IU_CNT implemented by the terminal TC. The simultaneous execution command consists in particular of delaying of the provision SG_PV to the initiator terminal TI on the basis of the transmission period either predetermined or measured between the initiator terminal and the correspondent terminal.

In particular, the initiator terminal TI comprises a change authorization SW_AUTH that determines whether the change has been signaled to the one or more communication terminals in the ongoing communication SS(m1), In particular, the change authorization SW_AUTH delays the change either for a predetermined period of time corresponding to the change data provision computing time and, optionally, transmission time to the correspondent terminal, or while awaiting an acknowledgement of receipt ack. Optionally, the user interface management method IU_MNGT (illustrated in FIG. 1) comprises the change authorization SW_AUTH.

In a first variant of the change, the change command SWC triggers the implementation of the change authorization SW_AUTH, which then sends the change SW a put on hold command sw_w (not illustrated) until it is determined that the change signaling data have been provided (predetermined period of time elapsed and/or one or more acknowledgements of receipt received, etc.). At this time, the change authorization SW_AUTH sends the change a change authorization command sw_acc (illustrated in FIG. 1).

In a second variant of the change, one or more of the following steps are placed in interception between the change command SWC and the change SW:
the change data provision SG_PV,
the change authorization SW_AUTH,
the user interface management IU_MGT,
the user interlace control IU_CNT of the initiator terminal.

The trigger signal sw_trg thus does not command the change SW when these one or more steps are finished. In particular, when the change authorization SW_AUTH is placed in interception, it transmits the change trigger signal sw_trg if the change signaling data have been provided (predetermined period of time elapsed and/or one or more acknowledgements of receipt received, etc.).

Thus, according to the variant embodiments of the provision, respectively the user interface of the initiator terminal TI_IU, the user interface of the correspondent terminal TC_IU, the user interfaces of the initiator terminal TI_IU and correspondent terminal TC_IU have been modified prior to the change phase SWPh corresponding to the execution of the change SW.

If the change of communication mode corresponds to a change of communication interface: switch from a first communication interface to a second communication interface, the change of communication mode SW comprises closing the communication session using the first communication mode SS(m1) and establishing a communication session using the second communication mode SS(m2) while still remaining in the same communication C. For example, in the communication history, only one and the same communication will appear, possibly with the exchanges being retained when the communication mode allows this, the timing of the communication will correspond to the entire communication regardless of the communication mode, etc.

In particular, once the change SW has been performed, the initiator terminal TI provides change signaling data SG_PV that command the return of the modified user interface to a nominal state (that is to say without the modifications performed prior to the change and taking into account the change of communication mode) to at least one communication terminal TI, TC in the ongoing communication SS(m2). Depending on the variant embodiment of the provision SG_PV performed prior to the change: The provision SG_PV transmits end of change signaling data $sge_{TC}$ to the user interface of the correspondent terminal TC; The provided change signaling data $sge_{TI}$ are intended for the user interface of the initiator terminal TI; the provision SG_PV transmits change signaling data $sge_{TC}$ to the user interface of the correspondent terminal TC and provides change signaling data $sge_{TI}$ to the user interface of the initiator terminal TI.

In particular, the end of change signaling data $sge_{TC}$ are transmitted to the correspondent terminal TC via the ongoing communication SS(m2).

In the third variant, the provision SG_PV of the change signaling data $sge_{TC}$ to the user interface of the correspondent terminal TC and the provision SG_PV of the change signaling data $sge_{TI}$ to the user interface of the initiator terminal TI may be performed simultaneously. The return of the interfaces to the nominal state is thus performed in a manner synchronized with all of the user interfaces of the communication terminals TI and TC in the ongoing communication.

In particular, the initiator terminal TI implements user interface management (not illustrated) comprising the provision SG_PV of end of change signaling data.

In particular, the initiator terminal TI implements user interface control IU_CNT controlling parameters pcmd$_{TI}$' of its user interface TI_IU on the basis of the end of change signaling data sge$_{TI}$.

In particular, the correspondent terminal TC implements user interface control IU_CNT controlling parameters pcmd$_{TI}$' of its user interface TC_IU on the basis of the end of change signaling data sge$_{TC}$.

Optionally, in the third variant, the provision SG_PV of the end of change signaling data controls simultaneous, or even synchronized, execution of the user interface control IU_CNT implemented by the initiator terminal TI and the user interface control IU_CNT implemented by the terminal TC. The simultaneous execution command consists in particular of delaying of the provision SG_PV to the initiator terminal TI on the basis of the transmission period either predetermined or measured between the initiator terminal and the correspondent terminal.

Figure 4:
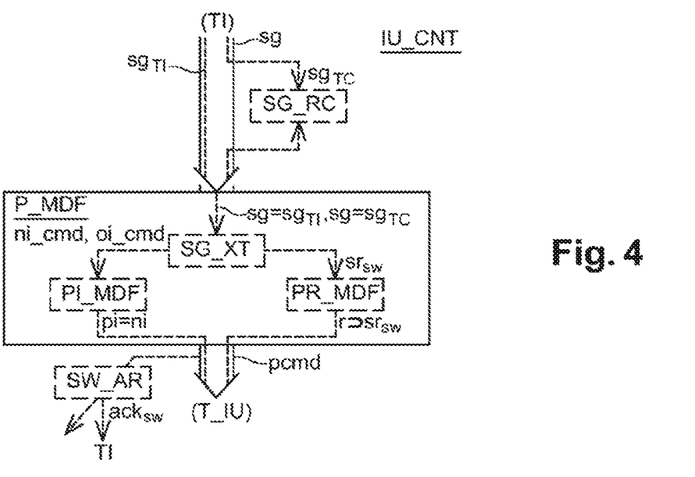
FIG. 4 shows a simplified diagram of a communication architecture comprising communication terminals implementing the devices of the invention.

FIG. 4 illustrates a simplified diagram of a communication architecture comprising communication terminals implementing the devices of the invention.

The communication architecture comprises communication terminals 1, 2, . . . 2n in ongoing communication, in particular an initiator terminal 1 initiating a change of communication mode of the ongoing communication and one or more correspondent terminals 2 . . . 2n.

In particular, the communication terminals 1, 2 . . . 2n comprise a communication interface 11, 12. The communication is established by way of a communication session in a first communication mode SS(m1) between the communication interface 11 of a communication terminal 1 and at least one communication interface 21 of a communication terminal 2, 2n.

In particular, the communication interface 11, 12 comprises communication session establishment means 114. The establishment means 114 establish com_trg a communication possibly using a first communication interface 111 with a first communication network or a second communication interface 112 with a second communication network.

In particular, the communication terminals 1, 2 . . . 2n comprise a user interface 10, 20. The user interlace 10, 20 comprises a capturing interface 1011, 2011 for capturing the exchange e1, e2 from the user U1, U2 and a reproduction interface 1012, 2012 for reproducing the exchange e2, e1 received from the communication terminal 2 . . .. 2n, 1. In particular, a direct interface with the user 101, 201 comprises the capturing interface 1011, 2011 and/or the reproduction interface 1012, 2012, where applicable. The user interfaces 10, 20 are connected to the respective communication interfaces 11, 21 so as to transmit the exchanges e1, e2 between the user U1. and the user U2 via the established communication session SS(m1).

The initiator terminal 1 comprises in particular a management interface 13 for managing a user interface of a communication terminal 1, 2 . . . 2n.

The management interface 13 of an initiator terminal 1 that triggered a change of communication mode during an ongoing communication SS(m1) between communication terminals including the initiator terminal and at least one correspondent terminal comprises a provider 130 for providing change signaling data sg to a user interface 10, 20 of a communication terminal 1, 2, 2n in the ongoing communication. The change signaling data sg are able to control the user interface 10, 20 of a communication terminal 1, 2, 2n. The provider 130 is triggered prior to the change of communication mode.

In particular, the provider 130 comprises a transmitter 1302 for transmitting the change signaling data to at least one correspondent terminal 2, 2n.

In particular, the provider 130 comprises a generator 1301 for generating data for signaling a change on the basis of the triggered change of communication mode. The generator 1301 is triggered prior to the change of communication mode.

In particular, the management interface 13 comprises a change timer 131 able to check that the change signaling data sg are provided to the one or more communication terminals 1, 2, . . . 2n before the change of communication mode. The change timer 131 is implemented in particular in interception between the change controller 115 and the switch 114: It provides the change trigger command sw_trg generated by the change controller 115 when the change signaling data have been provided. In an alternative mode of implementation, the change controller 115 commands the trigger sw_trg for triggering the change of communication mode directly at the switch 114. In this case, the change timer 115 optionally sends, to the switch 114, as soon as the change sw_trg is triggered, a command to put the change of communication mode on hold.

The correspondent terminal 2 implements a user interface 20. The user interface 20 of the correspondent terminal 2 comprises a modifier 2024, 240 for modifying at least one parameter of the user interface 20 of the correspondent terminal 2 upon command from the change signaling data sg$_{TC}$ received from the initiator terminal 1. The modifier 2024, 240 is implemented at least prior to a change, triggered by the initiator terminal 1, of communication mode of the ongoing communication.

In particular, the modifier 240 is implemented in a control interface 24 for controlling the user interface 20 of the correspondent terminal 2, or the modifier 2024 is implemented in a processor 202 of the user interface.

The initiator terminal 1 implements a user interface 10 of an initiator terminal 1. The user interface 10 of the initiator terminal 1 comprises a modifier 1024, 140 for modifying at least one parameter of the user interface 10 of the initiator terminal 1 upon command from the change signaling data sg$_{TI}$ provided by the initiator terminal 1. The modifier 1024, 140 is implemented at least prior to a change, triggered by the initiator terminal 1, of communication mode of the ongoing communication.

In particular, the modifier 140 is implemented in a control interface 14 for controlling the user interface 10 of the initiator terminal 1, or the modifier 1024 is implemented in a processor 102 of the user interface.

In particular, the control interface 14, 24 comprises an acknowledgement of receipt transmitter 141, 241 sending acknowledgement of receipt data ack$_{TI}$, ack$_{TC}$ to the management interface 13 either as soon as the control interface 14, 24 has change signaling data sg$_{TI}$, sg$_{TC}$ or as soon as the control interface 14, 24 commands pcmd the modification of a parameter of the user interface 10, 20.

In particular, the user interface processor 102, 202 generates and/or formats the reproduction signal reproduced by the reproduction interface 1012, 2012. In the case of a communication, with the payload signal carrying for example the voice of the user U2, U1 constituting a contact partner in the communication, the processor extracts the voice signal and provides it as reproduction signal, possibly after audio decoding.

In particular, the user interface processor 102, 202 generates interaction elements and/or analyzes the interaction actions provided by the capturing interface 1011, 2011.

The initiator terminal 1 comprises:
- a switch 114 for switching communication mode, implementing, upon command from the initiator terminal 1, a change of communication mode in an ongoing communication between the initiator terminal 1 and at least one correspondent terminal 2 . . . 2n,
- a user interface 12, and
- a management interface 13.

In particular, the initiator terminal 1 furthermore comprises:
- a first communication interface 111 with a first communication network implementing a first communication mode m1, and
- at least one second communication interface 112 with a second communication network separate from the first communication network and implementing at least one second communication mode m2.

In particular, the initiator terminal 1 comprises a communication interface 11 able to use a plurality of separate communication modes m1, m2, in particular with a plurality of separate communication networks.

In particular, the communication interface 11 comprises a change of communication mode controller 115. The change controller 115 is triggered either by a communication analyzer 113 or by an action by the user U1.

In particular, the communication analyzer 113 monitors the ongoing communication and at least one other available communication mode. The communication analyzer 113 thus decides to change communication mode based on the monitoring data and triggers the change controller 115.

In particular, when the change of communication mode corresponds to a switch from a first communication mode m1 using a first communication network to a second communication mode m2 using a second communication network, the change controller 115 commands the communication establishment means 114 to close the communication session SS(m1) using the first communication mode m1 and to open a communication session SS(m2) using the second communication mode m2 for the ongoing communication. The communication establishment means 114 then constitute a switch for switching communication mode.

In particular, the user interface 10, 20 comprises a reproduction controller 10122, 2022 controlling the reproduction interface 1012, 2012 on the basis of a reproduction signal r intended for the user U1, U2.

In particular, the user interface 10, 20 comprises an interaction interface 1021, 2021 able to analyze the interactions i captured by the capturing interface 1011, 2011 in particular upon selection of a selectable element by the user U1, U2. The selectable element is an element reproduced by the reproduction interface 1012, 2012 in particular upon command from the reproduction signal generator 1022, 2022.

The correspondent terminal 2 . . . 2n comprises:
- a communication interface 21 able to receive communication signaling data $sg_{TC}$ from an initiator terminal 1 in an ongoing communication and to modify parameters of the communication interface on the basis of the communication signaling data, the communication signaling data being able to authorize a change of communication mode of the ongoing communication by the correspondent terminal, and
- a user interface 20.

In particular, the correspondent terminal 2 . . . 2n furthermore comprises:
- a first communication interface 211 with a first communication network implementing a first communication mode m1, and
- at least one second communication interface 212 with a second communication network separate from the first communication network and implementing at least one second communication mode m2.

Let us consider an ongoing communication between a first communication terminal 1 and a second communication terminal 2 using a first communication mode m1. A first user U1 exchanges e1, e2 with a second user U2 by way, respectively, of the first terminal 1 and of the second terminal 2 via the ongoing communication.

The analyzer 113 provides information relating to the communication modes m1, m2 available on the first terminal 1 for the ongoing communication. Optionally, on the basis of its information relating to the communication modes (quality, connectivity, etc.), the analyzer 113 optionally decides on an action to change communication mode. Its information and/or an action iuc are in particular reproduced and/or proposed to the first user U1 by way of the reproduction interface 1012. Either the first user U1 uses a capturing interface 1011 and the interaction interface 1021 of the user interface 10 to command a change of communication mode by selecting a second communication mode following the reproduction of the information and/or upon proposal of a change action by the analyzer 113, or the analyzer 113 directly sends the decision to change communication mode from the first communication mode to a second communication mode on the basis of its information.

The change controller 115 receives the decision to change communication mode, in particular the new selected/decided communication mode, and triggers the change sw_trg. The change trigger signal sw_trg controls the switch 114. In parallel, this trigger signal sw_trg triggers the management interface or user interface manager 13, which provides the change signaling data.

The management interface or manager 13 is optionally placed in interception between the change controller 115 and the switch 114. This makes it possible to ensure that the change signaling data sg are provided before the switch 114 triggers sw_trg the change of communication mode. Optionally, the timer 131 commands the switch 114 to wait sw_w for the change signaling data sg to be provided before performing the triggered change.

The management interface or manager 13 provides change signaling data sg either directly to the user interface 10, 20 of the one or more communication terminals 1, 2 or to the control interface 14, 24 for controlling the user interface of the communication terminal 1, 2, Optionally, an acknowledgement of receipt transmitter 141, 241 indicates $ack_{TT}$, $ack_{TC}$ to the management interface or manager 13 that the change signaling data have indeed been provided. The tinier 131 receiving the acknowledgement of receipt data triggers the switch 114, The change signaling data are used to modify at least one user interface parameter 10, 20 upon command from a control interface 14, 24. The modifier 124, 2024 either receives the change signaling data directly or receives a parameter modification command based on these change signaling data and controls the reproduction signal generator 1022 and/or the interaction interface 1021 able to generate interaction elements. The modifier 124, 2024 thus makes it possible to control the reproduction of a message containing information relating to the change and/or blocking/unblocking of the interaction element.

The signaling data thus optionally make it possible to block the option for the one or more users U1, U2 to use an interaction element to command a second change of communication mode and/or closure of an ongoing communication while a first change of communication mode is being executed.

At the end of the change of communication mode. the switch 114 optionally triggers the management interface 13, which then provides end of change signaling data to the one or more control interfaces 14, 24 and/or user interfaces 10, 20 (in particular to the processor 102, 202 of the user interface) so as to command the return of the one or more user interfaces 10, 20 to a nominal state.

FIGS. 5a to 5f show simplified illustrations of the user interfaces of communication terminals according to the invention at various times of the change of communication mode.

Figure 5A:
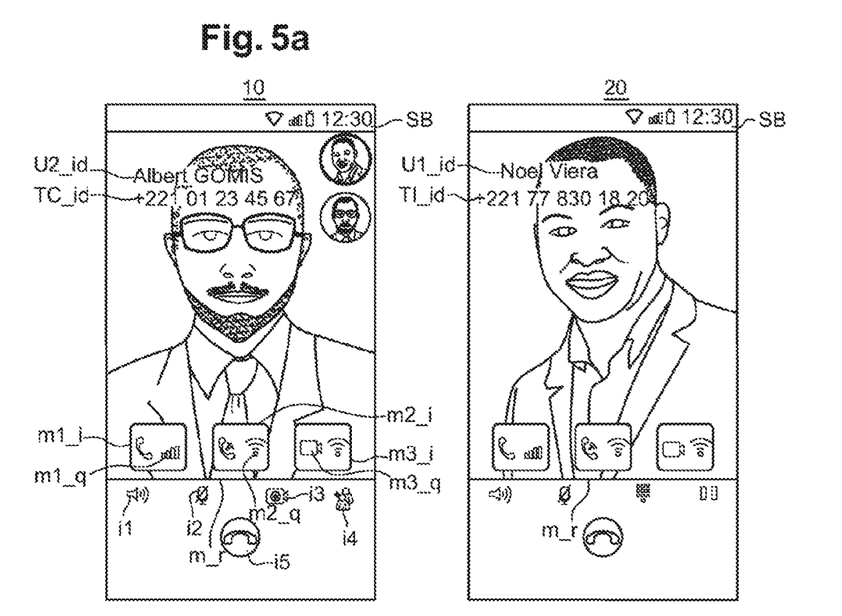
FIG. 5a shows a simplified illustration of the user interfaces of communication terminals according to the invention prior to triggering of the change of communication mode.

FIG. 5a illustrates a simplified illustration of the user interfaces of communication terminals according to the invention prior to triggering of the change of communication mode.

The user interface 10 of the initiator terminal reproduces in particular at least one of the following items of information or interaction elements:
  a status bar SB,
  an identifier of the second user U2_id of the correspondent terminal TC,
  an identifier of the correspondent terminal TC_id,
  an element indicating the communication mode being used m_r, in this case the second communication mode: IP audio call mode
  interaction elements for interacting with a plurality of communication modes m1_i: mobile telephony call mode, m2_i: IP audio call mode, m3_i: IP video call mode, available for the ongoing communication,
  information in relation to a plurality of communication modes m1_q, m2_q, m3_q, and
  other interaction elements i1, i2, i3, i4, i5, such as an interaction element for interacting with the loudspeaker i1, an interaction element for interacting with the microphone i2, an interaction element for interacting with the camera i3, a communication closure element i5,
  etc.

The user interface 20 of the initiator terminal reproduces in particular at least one of the following items of information or interaction elements:
  a status bar SB,
  an identifier of the first user U1_id of the initiator terminal TI,
  an identifier of the initiator terminal TI_id,
  an element indicating the communication mode being used m_r,
  interaction elements for interacting with a plurality of communication modes m1_i, m2_i, m3_i available for the ongoing communication,
  information in relation to a plurality of communication modes m1_q, m2_q,m3_q,and
  other interaction elements i1, i2, i3, i4, i5, such as an interaction element for interacting with the loudspeaker i1, an interaction element for interacting with the microphone i2, an interaction element for interacting with the camera i3, a communication closure element i5,
  etc.

Figure 5B:
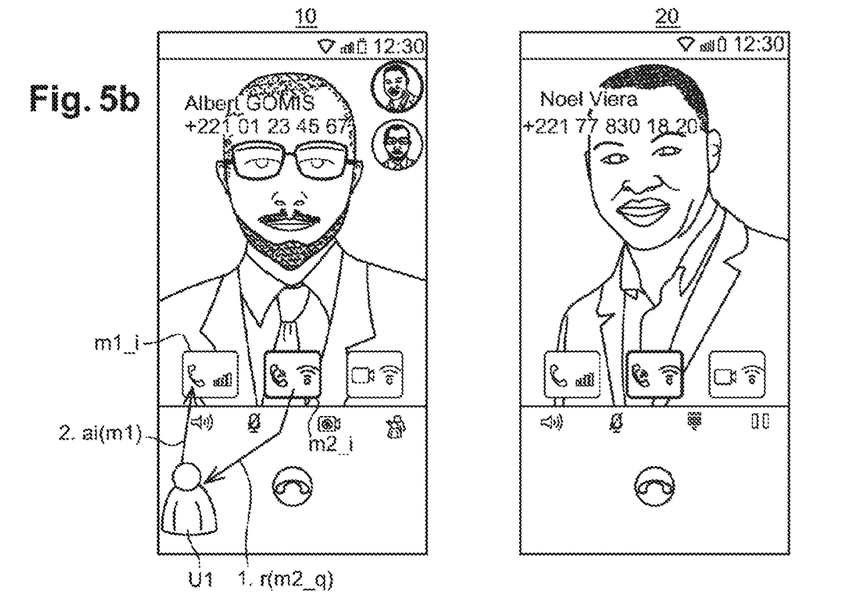
FIG. 5b shows a simplified illustration of the user interfaces of communication terminals according to the invention when the change of communication mode is triggered upon action by the user of an initiator terminal.

FIG. 5b illustrates a simplified illustration of the user interfaces of communication terminals according to the invention when the change of communication mode is triggered upon action by the user of an initiator terminal.

In the case of FIG. 5b, the first user U1 receives the reproduced information, in particular quality information relating to the ongoing communication mode 1. r(m2_q). In particular, the user U1 observes a deterioration in the quality of the communication mode being used (for example, notified by a change in color of the quality icon: switch from green to orange or even to red). The first user U1 selects 2.ai(m1) the interaction element of the first communication mode m1_i.

Figure 5C:
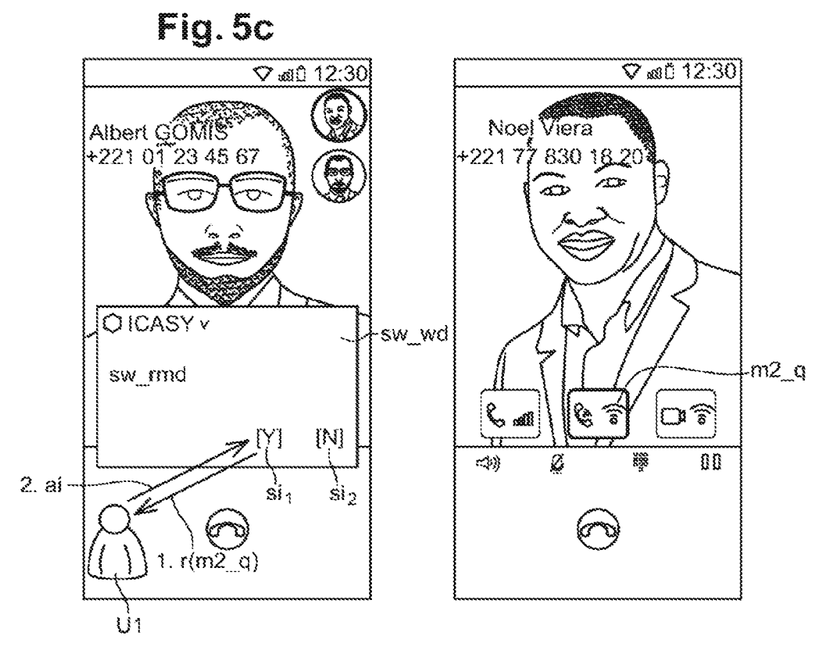
FIG. 5c shows a simplified illustration of the user interfaces of communication terminals according to the invention when the change of communication mode is triggered upon acceptance, by the user of an initiator terminal, of a proposal from the initiator terminal.

FIG. 5c illustrates a simplified illustration of the user interfaces of communication terminals according to the invention when the change of communication mode is triggered upon acceptance, by the user of an initiator terminal, of a proposal from the initiator terminal.

In the case of FIG. 5c, the management interface 13 sends change signaling data that command reproduction of a change proposal message SW_rmd in particular in a window sw_wd of the user interface of the initiator terminal 10, optionally with interaction elements si1 and si2 allowing the first user U1 to choose to accept [Y] or decline [N] the change proposal.

The first user U1 perceives the reproduced message 1.r(rmd) and interacts 2.ai so as to possibly indicate a request to change communication mode.

Figure 5D:
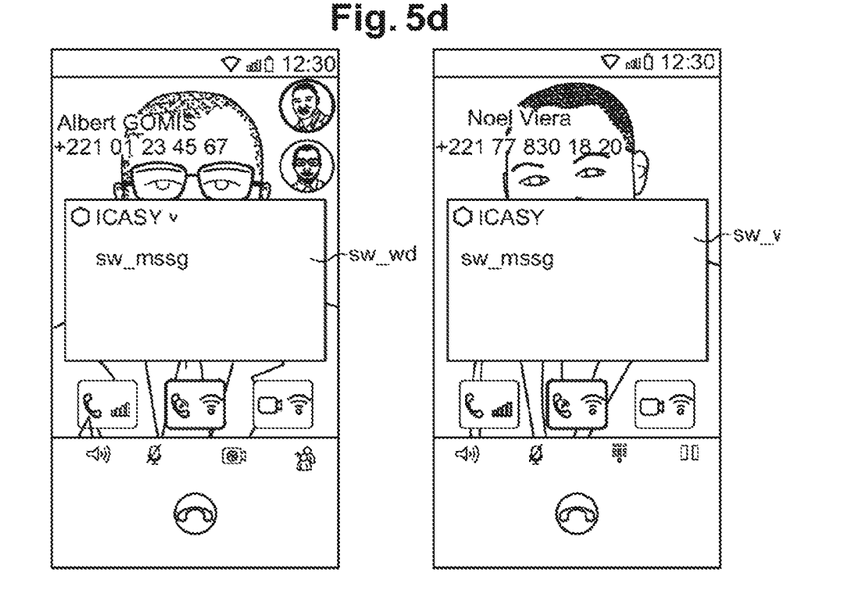
FIG. 5d shows a simplified illustration of the user interfaces of communication terminals according to the invention implementing a first variant of the invention.

FIG. 5d illustrates a simplified illustration of the user interfaces of communication terminals according to the invention implementing a first variant of the invention.

Following a request to change communication mode either from the analyzer 113 or upon request from the first user U1 through selection of a second communication mode as illustrated in FIG. 5b or through acceptance of a proposal to change communication mode as illustrated in FIG. 5c, signaling data are provided that command the reproduction of a changeover information message SW_mssg on the one or more user interfaces 10, 20 of the communication terminals, in particular in a display window SW_wd.

Figure 5E:
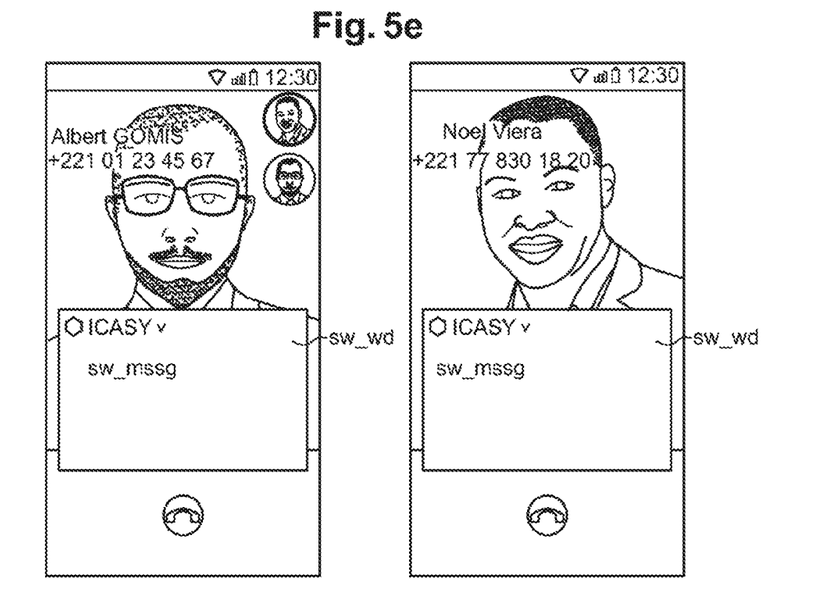
FIG. 5e shows a simplified illustration of the user interfaces of communication terminals according to the invention implementing a second variant of the invention.

FIG. 5e illustrates a simplified illustration of the user interfaces of communication terminals according to the invention implementing a second variant of the invention.

Following a request to change communication mode either from the analyzer 113 or upon request from the first user U1 through selection of a second communication mode as illustrated in FIG. 5b or through acceptance of a proposal to change communication mode as illustrated in FIG. 5c, signaling data are provided that command the reproduction of a changeover information message SW_mssg on the one or more user interfaces 10, 20 of the communication terminals, in particular in a display window SW_wd.

In particular, the display window SW_wd is reproduced in the user interface 10, 20 in a position masking the interaction elements for interacting with the communication modes and the communication closure, as illustrated in FIG. 5a.

Figure 5F:
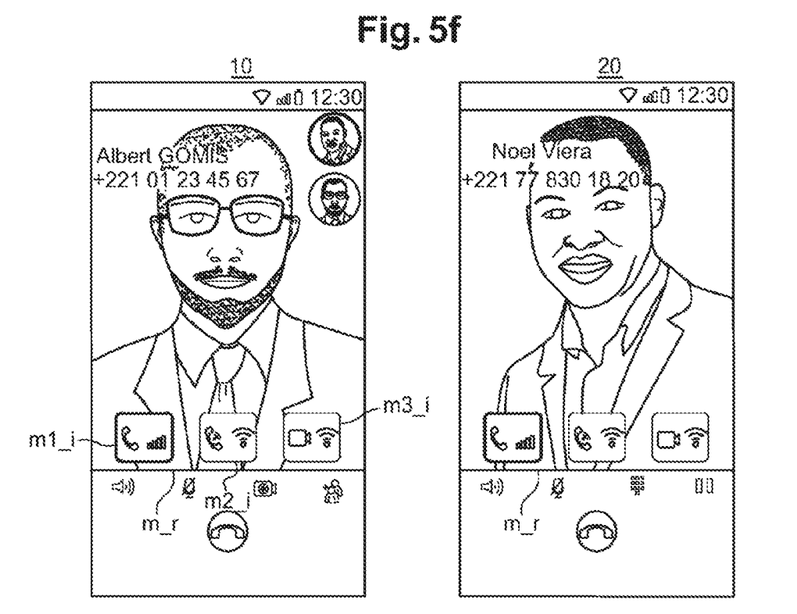
FIG. 5f shows a simplified illustration of the user interfaces of communication terminals according to the invention after the change of communication mode.

FIG. 5f illustrates a simplified illustration of the user interfaces of communication terminals according to the invention after the change of communication mode.

FIG. 5f shows the return of the user interfaces 10, 20 to a nominal state in which the communication mode being used, now m_r, is indicated as being the first communication mode.

The invention also targets a medium. The information medium may be any entity or device capable of storing the program. For example, the medium may include a storage means, such as a ROM, for example a CD-ROM or a microelectronic circuit ROM, or else a magnetic recording means, for example a floppy disk or a hard disk.

Moreover, the information medium may be a transmissible medium such as an electrical or optical signal, which may be routed via an electrical or optical cable, by radio or by other means. The program according to the invention may in particular be downloaded from a network, in particular from the Internet.

As an alternative, the information medium may be an integrated circuit in which the program is incorporated, the circuit being designed to execute or to be used in the execution of the method in question.

In another implementation, the invention is implemented by way of software and/or hardware components. With this in mind, the term module may correspond equally to a software component or to a hardware component. A software component corresponds to one or more computer programs, one or more subroutines of a program or, more generally, to any element of a program or of software that is capable of implementing a function or a set of functions in accordance with the above description. A hardware component corresponds to any element of a hardware assembly that is capable of implementing a function or a set of functions.

The invention claimed is:

1. A method for management of a user interface of at least one communication terminal by an initiator terminal during an ongoing communication between communication terminals including the initiator terminal and at least one correspondent terminal, the user interface management method comprising:
   providing change signaling information to a user interface of the at least one communication terminal, the change signaling data configured to control the user interface of a communication terminal,
   after providing the change signaling information, changing a communication mode of the ongoing communication, the changing of the communication mode triggered by the initiator terminal; and
   when the change of communication mode of the ongoing communication ends, providing, to at least one communication terminal, end of change signaling data configured to command the return of the user interface of the correspondent terminal to a nominal state, wherein the nominal state is a state of the user interface without the modifications prior to the change of the communication mode and taking into account the change of communication mode.

2. The user interface management method of claim 1, wherein the provision of change signaling data to the user interface of the at least one communication terminal comprises transmission of the change signaling data to at least one correspondent terminal, the change signaling data configured to control the user interface of the correspondent terminal.

3. The user interface management method of claim 1, wherein the method comprises generation of change signaling data on the basis of the triggered change of communication mode.

4. The user interface management method of claim 1, wherein the change signaling data prior to the change of communication mode integrate a blocking command to block the user interface of the communication terminal during the change of communication mode.

5. The user interface management method of claim 1, wherein the change signaling data integrate an information reproduction signal for reproducing information relating to the change of communication mode.

6. The user interface management method of claim 1, wherein the end of change signaling data integrate an unblocking command to unblock the user interface.

7. The user interface management method of claim 1, wherein the method comprises an authorization to change communication mode, the authorization to change communication mode preventing the change of communication mode of the ongoing communication for as long as the change signaling data are not provided to at least the user interface of the at least one correspondent terminal.

8. A non-transitory, computer-readable storage medium having stored thereon instructions which, when executed by a processor, cause the processor to implement the method of claim 1.

9. A method for controlling a user interface of a communication terminal during a communication between communication terminals including an initiator terminal and at least one correspondent terminal, the control method comprising:
   modifying, upon command from change signaling data provided by the initiator terminal, at least one parameter of the user interface of the communication terminal, the modification of the at least one parameter of the user interface of the communication terminal being performed prior to a change of a communication mode of the ongoing communication, the change of the communication mode triggered by the initiator terminal; and
   when the change of communication mode of the ongoing communication ends. providing, to at least one communication terminal, end of change signaling data configured to command the return of the user interface of the correspondent terminal to a nominal state, wherein the nominal state is a state of the user interface without the modifications prior to the change of the communication mode and taking into account the change of communication mode.

10. A non-transitory, computer-readable storage medium having stored thereon instructions which, when executed by a processor, cause the processor to implement the method of claim 9.

11. An initiator terminal configured to trigger a change of communication mode during an ongoing communication between communication terminals including the initiator terminal and at least one correspondent terminal, the initiator terminal comprising a processor, the initiator terminal configured to:
   provide change signaling data to a user interface of a communication terminal in the ongoing communication, the change signaling data being able to control the user interface of a communication terminal, the signaling data being provided prior to the change of a communication mode, and
   when the change of communication mode of the ongoing communication ends, provide, to at least one communication terminal, end of change signaling data configured to command the return of the user interface of the correspondent terminal to a nominal state, wherein the nominal state is a state of the user interface without the modifications prior to the change of the communication mode and taking into account the change of communication mode.

12. The initiator terminal of claim 11, further configured to:
   upon command from the initiator terminal, implement a change of a communication mode of an ongoing communication between the initiator terminal and at least one correspondent terminal, and modify at least one parameter of the user interface of the initiator terminal upon command from the change signaling data provided by the initiator terminal, the modification of the at least one parameter of the user interface of the initiator terminal being performed prior to a change, triggered by the initiator terminal, of the communication mode of the ongoing communication.

13. A correspondent terminal comprising a processor, the correspondent terminal configured to, during a communication between communication terminals including an initiator terminal and at least one correspondent terminal:

modify at least one parameter of the user interface of the correspondent terminal upon command from change signaling data received from the initiator terminal, the modification of the at least one parameter of the user interface of the correspondent terminal being performed prior to a change, triggered by the initiator terminal, of a communication mode of the ongoing communication, and when the change of communication mode of the ongoing communication ends, provide, to at least one communication terminal, end of change signaling data configured to command the return of the user interface of the correspondent terminal to a nominal state, wherein the nominal state is a state of the user interface without the modifications prior to the change of the communication mode and taking into account the change of communication mode.

14. The correspondent terminal of claim 13, the correspondent terminal further configured to:
receive, via a communication interface, communication signaling data from an initiator terminal in an ongoing communication and to modify parameters of the communication interface on the basis of the communication signaling data, the communication signaling data being able to authorize a change of a communication mode of the ongoing communication by the correspondent terminal.

15. An initiator terminal comprising a processor, the initiator terminal configured to, during a communication between communication terminals including an initiator terminal and at least one correspondent terminal:

modify at least one parameter of the user interface of the initiator terminal upon command from change signaling data provided by the initiator terminal, the modification of the at least one parameter of the user interface of the initiator terminal being performed prior to a change, triggered by the initiator terminal, of a communication mode of the ongoing communication, and when the change of communication mode of the ongoing communication ends, provide, to at least one communication terminal, end of change signaling data configured to command the return of the user interface of the correspondent terminal to a nominal state, wherein the nominal state is a state of the user interface without the modifications prior to the change of the communication mode and taking into account the change of communication mode.

* * * * *